US006980898B2

(12) United States Patent
Hosler et al.

(10) Patent No.: US 6,980,898 B2
(45) Date of Patent: Dec. 27, 2005

(54) DOWNSHIFT ACCELERATION CONTROL

(75) Inventors: Nathan Hosler, Rochester Hills, MI (US); Brandon Brigham, Clarkston, MI (US); Javed Dada, Lapeer, MI (US); Michael J McNeil, Rochester Hills, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 121 days.

(21) Appl. No.: 10/741,926

(22) Filed: Dec. 19, 2003

(65) Prior Publication Data

US 2005/0137770 A1 Jun. 23, 2005

(51) Int. Cl.[7] .......................... G06G 7/00; B60K 41/04

(52) U.S. Cl. ........................... 701/51; 701/55; 701/61; 477/121

(58) Field of Search ............................. 701/51, 55, 56, 701/61, 64, 67, 63, 93, 100; 477/120–122, 477/107, 109, 118, 132, 138–141, 144–148, 477/102, 154; 123/478, 479

(56) References Cited

U.S. PATENT DOCUMENTS

| | | | | |
|---|---|---|---|---|
| 4,622,866 A * | 11/1986 | Ito et al. | ..................... | 477/122 |
| 4,788,890 A * | 12/1988 | Anderson | ................... | 477/102 |
| 4,891,759 A * | 1/1990 | Kato | ........................... | 701/54 |
| 5,029,087 A * | 7/1991 | Cowan et al. | ................ | 701/68 |
| 5,036,729 A * | 8/1991 | Nitz et al. | .................. | 477/148 |
| 5,505,179 A * | 4/1996 | Brennan | ..................... | 123/479 |
| 5,794,170 A * | 8/1998 | Kuroda et al. | ................ | 701/93 |
| 6,554,741 B2 * | 4/2003 | Saito | .......................... | 477/120 |

* cited by examiner

*Primary Examiner*—Tan Q. Nguyen
(74) *Attorney, Agent, or Firm*—Ralph E. Smith

(57) ABSTRACT

A turbine acceleration control system for a transmission in a vehicle determines a desired turbine acceleration based on a downshift type and an altitude of the vehicle. The turbine acceleration control system determines a downshift type that results from one of a throttle increase, a manual downshift, or vehicle deceleration. An altitude module determines an altitude of the vehicle. A vehicle controller communicates with one or more lookup tables to determine the desired turbine acceleration based on the downshift type and the altitude. Additionally, current turbine speed and torque converter slip are considered by the controller in determining the desired turbine acceleration.

20 Claims, 3 Drawing Sheets

60

| SHIFT TYPE | DESIRED ACCELERATION |
|---|---|
| 4-3 | 1000 |
| 4-2 | 1600 |
| 3-2 | 1600 |
| 3-1 | 1400 |
| 2-1 | 1400 |

| SHIFT TYPE | TURBINE ACCELERATION | | | | | HIGH ALTITUDE TURBINE ACCELERATION | | | | |
|---|---|---|---|---|---|---|---|---|---|---|
| | 500 | 1500 | 2500 | 3500 | 4500 | 500 | 1500 | 2500 | 3500 | 4500 |
| 4-3 | 2000 | 2000 | 2600 | 3000 | 3800 | 2000 | 2000 | 2600 | 3000 | 3800 |
| 4-2 | 3500 | 3500 | 4000 | 4500 | 5000 | 3000 | 3000 | 3500 | 4000 | 4500 |
| 3-2 | 2500 | 2500 | 3000 | 3200 | 3500 | 2000 | 2000 | 2500 | 2700 | 3000 |
| 3-1 | 3500 | 3500 | 3700 | 3900 | 4000 | 3000 | 3000 | 3200 | 3400 | 3500 |
| 2-1 | 2000 | 2000 | 2600 | 3100 | 3700 | 1500 | 1500 | 2000 | 2300 | 2500 |

DOWNSHIFT ACCELERATION CONTROL

FIELD OF THE INVENTION

The present invention relates to a transmission in a vehicle, and more particularly to controlling acceleration of a turbine in the transmission.

BACKGROUND OF THE INVENTION

A transmission in a vehicle downshifts to a lower gear in response to various vehicle or driver behavior. For example, the transmission may downshift to a lower gear when the driver increases the throttle by a particular degree. In this instance, a throttle increase indicates a desire to accelerate the vehicle. A decrease in the speed of the vehicle may result in a coast downshift. During a coast downshift, the transmission detects that the vehicle has slowed below a certain threshold for the current gear and downshifts to a lower gear. Additionally, a manual downshift initiated by the driver causes the transmission to downshift to a lower gear. A driver may initiate a manual downshift to improve engine braking.

During a transmission downshift, the transmission turbine must accelerate to a speed level that is appropriate for the target gear. The transmission turbine spins at the same speed as the input of the transmission and determines how quickly the transmission is able to shift from one gear to another. Therefore, determining the appropriate acceleration of the turbine is important in order to establish effective downshifts. Various vehicle and environment conditions may affect the ability of the transmission turbine to accelerate properly. For example, the altitude of the vehicle affects air pressure and transmission performance. Current vehicle speed, transmission turbine speed, and torque converter slip also affect the appropriate turbine acceleration.

SUMMARY OF THE INVENTION

A turbine acceleration control system for a transmission in a vehicle comprises a shift module that determines a downshift type. An altitude module determines an altitude of the vehicle. A turbine speed sensor determines a speed of a turbine in the transmission. A controller communicates with the shift module, the altitude module, and the turbine speed sensor and determines a desired turbine acceleration based on the downshift type, the altitude, and the speed.

In another aspect of the invention, a turbine acceleration control method for a transmission in a vehicle comprises determining a downshift type at a shift module. An altitude of the vehicle is determined at an altitude module. A speed of a turbine in the transmission is determined at a turbine speed sensor. A desired turbine acceleration is determined based on the downshift type, the altitude, and the speed.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3A is a lookup table of turbine acceleration values according to the present invention; and FIG. 3B is a high altitude lookup table of turbine acceleration values according to the present invention.

DETAILED DESCRIPTION OF THE PREFERRED EMBODIMENTS

Figure 1:
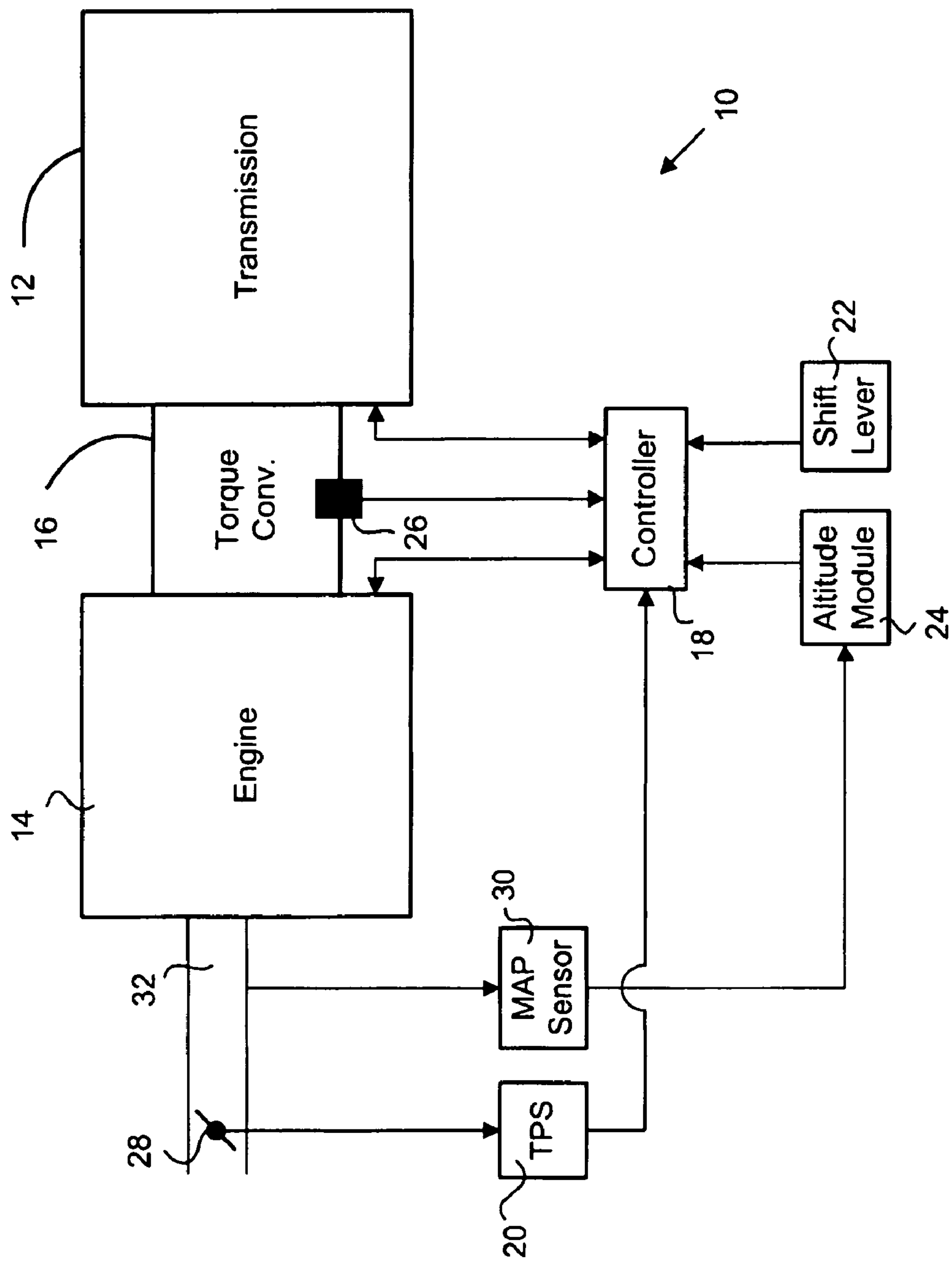
FIG. 1 is a functional block diagram of a downshift acceleration control system according to the present invention.

The following description of the preferred embodiment(s) is merely exemplary in nature and is in no way intended to limit the invention, its application, or uses.

A downshift acceleration control system 10 includes a vehicle transmission 12, an engine 14, and a torque converter 16. The transmission 12 receives rotational power from the engine 14 through the torque converter 16. The transmission 12 upshifts and downshifts based on a signal from a controller 18 as is known in the art. The transmission 12 may downshift in response to a throttle increase, vehicle deceleration, and/or a manual downshift. Typically, a downshift results in an increase in engine speed. Therefore, a downshift is accompanied by a concurrent increase in transmission turbine acceleration.

The controller 18 determines the desired transmission turbine acceleration based on inputs from a throttle position sensor 20, a shift lever 22, an altitude module 24, and a turbine speed sensor 26. The controller 18 receives a position of a throttle 28 from the throttle position sensor 20. The controller 18 receives a shift lever position from the shift lever 22.

The altitude module 24 calculates the altitude of the vehicle based upon a manifold absolute pressure (MAP) sensor 30. A method of determining altitude based on manifold absolute pressure is described in further detail in U.S. Pat. No. 5,542,390 entitled "METHOD OF ALTITUDE COMPENSATION OF EXHAUST GAS RECIRCULATION IN AN INTAKE MANIFOLD FOR AN INTERNAL COMBUSTION ENGINE," which is hereby incorporated by reference in its entirety. The MAP sensor 30 determines a pressure of air entering the engine 14 through an intake manifold 32.

The controller 18 determines torque converter slip based on a signal from the turbine speed sensor 26 and a signal from the engine 14. Torque converter slip is calculated based on a difference between the transmission turbine speed and the engine speed. The controller 18 determines a torque gain factor based on a downshift type and applies the torque gain factor to the torque converter slip. For example, the controller 18 may consult a torque gain factor lookup table of calibrated torque gain factors. Each downshift type has a corresponding torque gain factor. The controller 18 uses the torque converter slip thus modified by the torque gain factor to adjust the desired transmission turbine acceleration.

Figure 2:
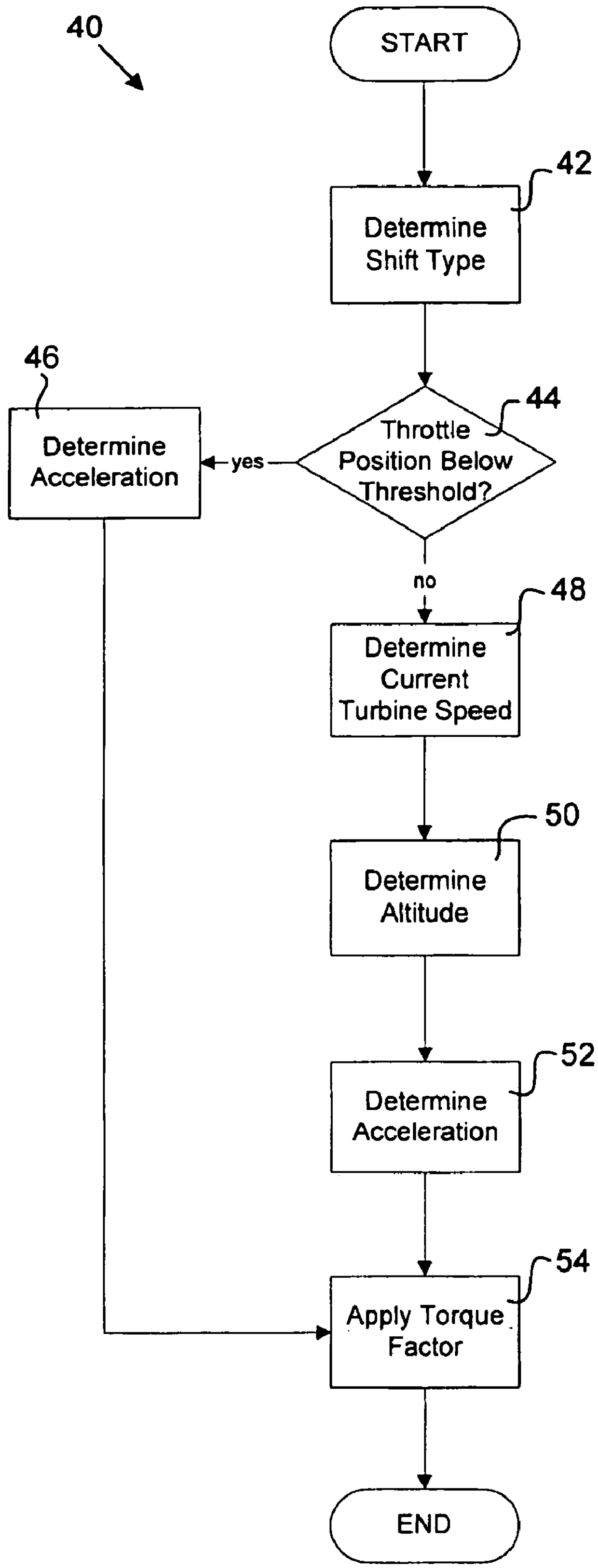
FIG. 2 is a flow diagram of a transmission turbine acceleration algorithm according to the present invention.

Referring now to FIG. 2, a transmission turbine acceleration algorithm 40 is shown. The algorithm 40 calculates the desired turbine acceleration during a downshift. At step 42, the algorithm 40 determines the shift type that resulted in the downshift operation. For example, downshift types may include, but are not limited to, fourth to third gear, fourth to second gear, third to second gear, third to first gear, and second to first gear. At step 44, the algorithm 40 determines if the throttle position value is below a predetermined threshold. If the throttle position value is below the threshold, the algorithm 40 determines the desired turbine acceleration according to the downshift type at step 46. In the preferred embodiment, the algorithm 40 determines the desired turbine acceleration at step 46 according to a first lookup table populated with turbine acceleration values. An exemplary low throttle value lookup table is shown in FIG. 3A. The turbine acceleration values are listed in units of RPM per second. If the throttle position value is above the threshold, the algorithm 40 determines the current turbine speed at step 48. At step 50, the algorithm 40 determines the altitude of the vehicle.

The algorithm 40 determines the desired turbine acceleration according to downshift type, current turbine speed, and altitude at step 52. In the preferred embodiment, the algorithm 40 determines the desired turbine acceleration according to a second lookup table populated with turbine acceleration values. An exemplary high throttle value lookup table is shown in FIG. 3B. The algorithm 40 adjusts the desired turbine acceleration at step 54 according to the torque factor. The torque factor is added directly to the desired turbine acceleration value that is determined at step 46 or step 52.

Referring now to FIG. 3A, the low throttle lookup table 60 includes a shift type 62 and turbine acceleration values 64. The desired turbine acceleration is selected based on a corresponding shift type 62.

Referring now to FIG. 3B, the high throttle value lookup table 70 includes a shift type 72, current turbine speed 74, turbine acceleration values 76, and high altitude turbine acceleration values 78. The desired turbine acceleration is determined according to both the turbine acceleration values 76 and the high altitude turbine acceleration values 78 based on the shift type 72 and the current turbine speed 74. For example, if the shift type is third gear to second gear and current turbine speed is 2500 RPM, a first turbine acceleration value of 3000 RPM per second is selected from the turbine acceleration values 76. A second turbine acceleration value of 2500 RPM per second is selected from the high altitude turbine acceleration values 78. The desired turbine acceleration is calculated based on the first and second turbine acceleration values. The desired turbine acceleration is an interpolation of the first and second acceleration values according to the altitude. Therefore, the desired turbine acceleration will be calculated between the first acceleration value of 3000 RPM per second and the second acceleration value of 2500 RPM per second depending on the altitude.

The lookup tables 60 and 70 may be populated with transmission performance data sampled at various elevations. For example, the turbine acceleration values 76 are derived based on transmission performance samples at sea level. The high altitude turbine acceleration values 78 are derived based on transmission performance samples at a high elevation such as 5000 feet. This transmission performance data is evaluated based on downshift quality and performance.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A turbine acceleration control system for a transmission in a vehicle comprising:

a shift module that determines a downshift type;

an altitude module that determines an altitude of the vehicle;

a turbine speed sensor that determines a speed of a turbine in the transmission; and a controller that communicates with the shift module, the altitude module, and the turbine speed sensor and determines a desired turbine acceleration based on the downshift type, the altitude, and the speed.

2. The system of claim 1 wherein the shift module determines the downshift type according to one of a position of a shift lever, a desired acceleration of the vehicle, and deceleration of the vehicle.

3. The system of claim 2 wherein the desired acceleration is indicative of a throttle increase.

4. The system of claim 1 wherein the altitude module determines the altitude based on an input from a manifold absolute pressure sensor.

5. The system of claim 1 wherein the controller further determines the desired turbine acceleration based on one or more lookup tables.

6. The system of claim 5 wherein the controller selects one of the one or more lookup tables based on a throttle position value, and wherein the controller determines the desired turbine acceleration based on the selected lookup table.

7. The system of claim 5 wherein the controller selects one of the one or more lookup tables based on the altitude, and wherein the controller determines the desired turbine acceleration based on the selected lookup table.

8. The system of claim 7 wherein the selected lookup table includes a first set of desired turbine acceleration values based on a first altitude and a second set of desired turbine acceleration values based on a second altitude, and wherein the controller determines the desired turbine acceleration by interpolating between the first set and the second set.

9. The system of claim 1 wherein the controller further determines the desired turbine acceleration based on torque converter slip.

10. The system of claim 9 wherein the controller determines the torque converter slip based on a difference between the speed of the turbine and an engine speed.

11. The system of claim 10 wherein the controller determines a torque gain factor based on the downshift type and modifies the torque converter slip according to the torque gain factor.

12. A turbine acceleration control method for a transmission in a vehicle comprising:

determining a downshift type;

determining an altitude of the vehicle;

determining a speed of a turbine in the transmission; and determining a desired turbine acceleration based on the downshift type, the altitude, and the speed.

13. The method of claim 12 wherein determining the downshift type includes determining the downshift according to one of a position of a shift lever, a desired acceleration of the vehicle, and a deceleration of the vehicle.

14. The method of claim 12 wherein determining the altitude includes determining the altitude based on a manifold absolute pressure.

15. The method of claim 12 wherein determining the desired turbine acceleration includes determining the desired turbine acceleration based on one or more lookup tables populated with desired turbine acceleration values.

16. The method of claim 15 further comprising selecting one of the one or more lookup tables based on a throttle position value, and wherein determining the desire turbine acceleration includes determining the desired turbine acceleration based on the selected lookup table.

17. The method of claim 15 further comprising selecting one of the one or more lookup tables based on the altitude, and wherein determining the desired turbine acceleration includes determining the desired turbine acceleration based on the selected lookup table.

18. The method of claim 12 further comprising determining a torque converter slip and further determining the desired turbine acceleration based on the torque converter slip.

19. The method of claim 18 further comprising determining torque converter slip based on a difference between the speed of the turbine and an engine speed.

20. The method of claim 18 wherein determining the torque converter slip includes modifying the torque converter slip based on a torque gain factor.

* * * * *